Nov. 11, 1941.   R. R. WARE   2,262,714
ROLLER
Filed Jan. 19, 1940
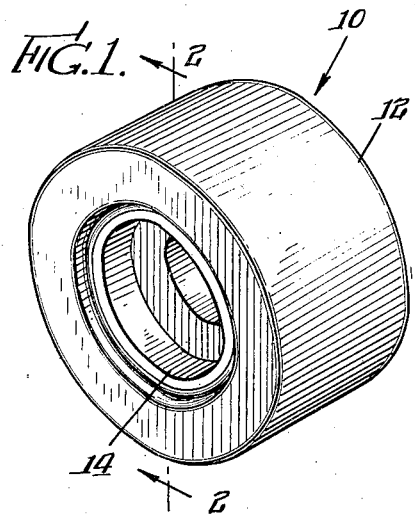
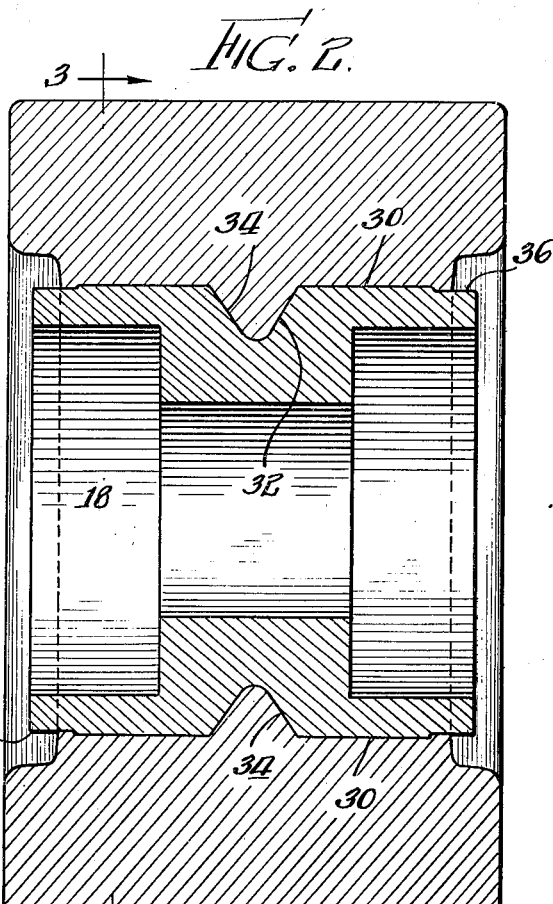
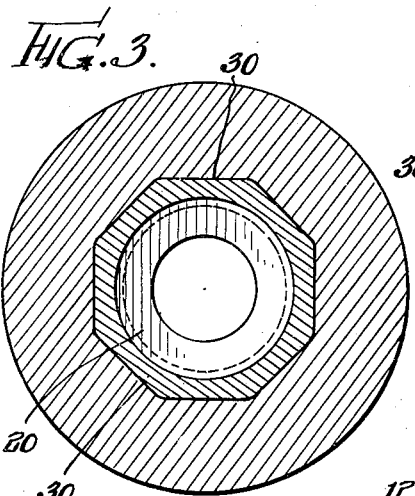
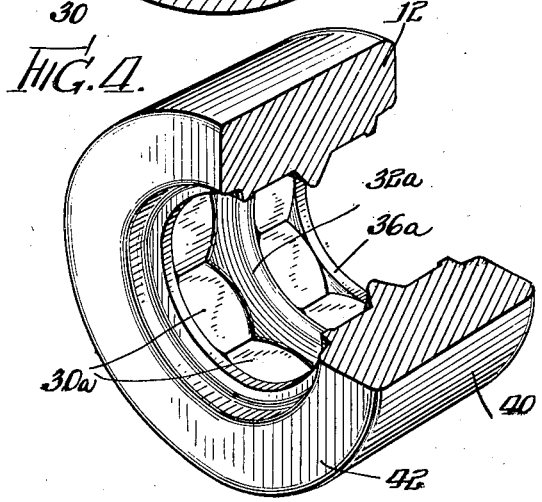
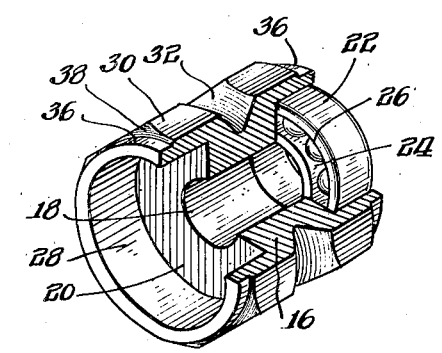
INVENTOR.
Robert R. Ware
BY: Cox & Moore
ATTORNEYS.

Patented Nov. 11, 1941

2,262,714

UNITED STATES PATENT OFFICE 2,262,714

ROLLER

Robert R. Ware, Chicago, Ill., assignor to Chicago Roller Skate Company, Chicago, Ill., a corporation of Illinois Application January 19, 1940, Serial No. 314,583

4 Claims. (Cl. 301—5.3)

The present invention relates to a wheel or roller construction, and more particularly to a wheel of the type which, while employed upon roller skates and the like, has utility in additional relationships.

The present invention contemplates more particularly a roller skate roller of the type having a tread portion suitable for use on indoor rinks employing relatively destructible surfaces and, accordingly, relates to a wheel or roller provided with a tire or tread portion adapted to cooperate with such a floor. That is to say, the present invention contemplates the employment of treads formed of relatively soft and non-destructible material with respect to the surface upon which it is to be employed. It will be seen, however, that such tread or tire materials are completely unsuited to the structural requirements of journal constructions such as are conventionally located centrally and axially of the wheel. In other words, it is essential in constructions of this type to employ a central bushing of hard material adapted to provide the necessary bearing surfaces.

As is recognized by those familiar with the present art, wooden tread or body portions, such as have been hitherto in general employment, have in numerous instances failed to structurally cooperate with the central bushing portion to give the reasonably desired span of service. This deficiency is in general recognized in the art as resulting from the variations occurring within woody and fibrous material as a result of atmospheric changes. In general, it may be said that all practically suitable materials, having the requisite combination of softness and toughness for the foregoing tread constructions, possess properties unsuiting them for permanent association with the central metallic bushing, particularly under the severe conditions of usage met with in the present art. Thus, in the relatively severe service normally encountered in the use of a roller skate, the bushing and tread must at all times be rigidly interlocked, since the minutest separation rapidly results in complete loosening.

It is accordingly an important object of the present invention to obviate the foregoing difficulties and provide a roller construction, as above, wherein the central bushing is permanently and positively joined to the tread by virtue of the interlocking association thereof, and particularly wherein the association is such as to overcome the detrimental influences of relative shrinkage and expansion, as well as strains encountered in use.

The present invention yet further contemplates the provision of a roller, as above, having a soft portion surrounding the central bushing and free from any restraining or enclosing rim. In other words, the present invention contemplates the construction wherein the soft portions of the roller form the rim or tread, and accordingly depend upon their inherent structural properties for association with the bushing.

A further object of the present invention is accordingly to provide an improved interlocking construction of increased permanence and reliability.

Yet other and further objects, advantages and inherent functions of the invention will become apparent as the same is more fully understood from the following description which, taken in connection with the accompanying drawing, discloses a preferred embodiment of the invention.

Referring to the drawing:

Figure 1 is a perspective view of a roller constructed in accordance with the present invention;

Figure 2 is a central, vertical, sectional view taken on the line 2—2 of Figure 1;

Figure 3 is a sectional detail view taken on the plane indicated by the line 3—3 of Figure 2;

Figure 4 is a perspective view of the tread or tire portion of the roller, with the bushing removed for the purpose of illustrating the interior configuration thereof, parts of the tread having likewise been broken away; and Figure 5 is a perspective view of the bushing shown in separate relationship from the tire, portions likewise having been broken away to illustrate the interior construction.

Referring to the figures of the drawing wherein the present invention is illustrated more in detail, there is shown a roller skate wheel or roller which I have designated generally by the reference numeral 10, the roller comprising a body, tire or tread portion 12 and a central bushing 14. The outer or tread portion of the wheel, in the present instance, is formed of moldable material which may be suitably shaped and formed about the central bushing and cured by any suitable method, including, for example, the application of heat and/or pressure, where desired. To this end, the material may comprise many suitable moldable materials, including resilient fibrous compositions.

It will be seen that the central bushing construction, appearing in detail in Figures 1, 2, 3, and 5, has a generally annular configuration comprising a body 16, with a central, axially-disposed bore 18 for receiving the axle, which will be understood by those skilled in the art. The axial, outer portions of the bushing are defined by relatively thin walls defining annular recesses 20 for the reception of antifriction bearings of the type disclosed in Figure 5.

Thus, attention is particularly directed to the fact that, in accordance with the present construction, the bushing provides for the reception of bearings having an outer annular race 22 with an opposed inner annular race 24 separated by antifriction bearing elements, such as balls 26 or any of the equivalent constructions known in the art. It will be seen that the axially-extending annular walls 28 of the opposite axial recesses 20 snugly receive the outer race 22, while it will be appreciated that the inner races 24 will be disposed upon the axle shaft (not shown). It will be seen that this construction provides an improved arrangement of the roller upon the skate axle, free from tensioning influences of the axle fasteners.

It should be particularly noted that the exterior surface of the bushing is characterized by a multi-sided exterior configuration having a plurality of axially extending side walls 30 disposed polygonally about the axis of the bushing. That is to say, the sectional external peripheral configuration of the bushing, at points wherein the flat wall sections are uninterrupted, present a polygonal pattern, in the present instance, corresponding to a regular symmetrical octagon. While the foregoing serves to illustrate the invention, it will be appreciated from the disclosure, however, that the invention is not limited to any specific form of prism.

Attention is particularly directed to the fact that, while the employment of a multisided bushing per se, in connection with a molded or fibrous, relatively soft tread portion, results in numerous advantages over the ordinary combination of cylindrical bushing and tread, with which I have been hitherto familiar, nevertheless, the development of the present invention has established that the ultimate desired permanence and serviceability do not result from a construction of this sort. In other words, it has been established and determined, in accordance with the present invention, that additional cooperative structure is essential in order to form a permanently rigid, molded roller adapted to withstand severe conditions of service over a long period of time, and to this end I have provided a construction shown more clearly in Figures 2, 4 and 5.

In accordance with this construction, it will be seen that the bushing (Figures 2 and 5) bears intermediate of its axial extremities a circumferentially disposed, annular groove or channel 32. It will be seen that this channel recess intersects all of the several flat sides of the bushing extending transversely thereto and peripherally about the unit. It should, furthermore, be noted that the recess has sufficient radial depth so that it projects substantially inwardly of the multisided surface intermediate of each of the flat planar surfaces and intermediate of the axial margins thereof, as well as at the apices formed by the juncture of the lateral axial side margins of adjacent flat surfaces. In other words, the annular groove is of substantial depth, as opposed to a recess merely interrupting the said points of juncture, and additionally provides relatively extensive side surfaces 34 extending axially, as well as radially.

It is conceived that the novel and improved holding effect achieved, results at least in part, from the clamping or holding action which the material of the tread operates to create against the opposite, inclined surfaces 34 defining the groove. While the foregoing is a statement of theory advanced merely to facilitate explanation of the present action, nevertheless, it is thought that as a reult of the molding of the tread or body portion of the wheel, normally carried out under pressure, the material is caused to grip the walls of the channel to set up permanent, elastic gripping forces having components resolved in opposite, axial directions. This effect, it has been found, results in a permanently associated assembly and has been found to effectively resist initial separation or loosening of the parts in service.

Referring again to Figure 5, it will be seen that the axial extremities of the bushing are similarly annularly cut away or deformed, as at 36, forming opposed inwardly extending faces 38 which similarly incline axially. It will be appreciated, however, that this construction affords nowhere near the permanent holding action of the central recess 32, among other reasons, due to the limited extent of the cooperating surfaces.

There is shown more in detail, in Figures 3 and 4, and particularly Figure 4, the cooperating complementary configuration of the molded tire or tread 12 associated with the bushing 14. It will be appreciated, from the foregoing, that the tread portion unit cannot normally exist separate from the bushing, as shown in Figure 4, but is disclosed in this form merely for purposes of illustration. It will be obvious, from the foregoing, that the present invention contemplates the formation of the unit 12 by molding about the bushing, shown in Figure 5, the unit being formed with a suitable plastic.

It will be seen that, as a result of the molding step, the material of the tread has assumed a complementary interior, multi-sided configuration comprising eight flat surfaces 30a circumferentially gripping surfaces 30. It will be seen, also, that the material of the tread 12 has been radially forced inwardly to occupy the relatively deep, annular groove 30, accordingly forming the radial ridge 32a in Figure 4. It will be similarly apparent that the molded body provides axially opposite, complementary interengaging ridges 36a for association with the axial extremities of the bushing.

The tire body or tread 12 has an annular peripheral floor contacting surface 40 and opposed side surfaces 42, whereby the projecting end extremities of the bushing are recessed somewhat as a protection against impact with external objects liable to damage by the relatively hard material thereof. Thus, the axial margins of the body 12 provide protective buffers.

It will be seen, from the foregoing, that the present invention provides an improved roller of simple and permanent serviceability construction. While it has been appreciated that the service conditions of the present art tend to result in ultimate loosening and separation of rollers constructed with hard central bushings and relatively soft tread body portions, I have discovered that the present invention affords an improved permanence which is not characteristic of the prior related rollers with which I am familiar.

It should be further noted that the present invention distinguishes in its preferred aspect not solely in the circumferential interlocking provided by multisided bushings, but provides a cooperating recess permitting the molded material to axially oppositely grip the bushing under pressure. In accordance with the present invention, it appears that this cooperative action results in sufficient additional engagement of the parts to permanently resist separation and loosening.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a roller for a roller skate or the like, comprising a molded tread portion and a central bushing portion of metal, said tread being formed of relatively soft material tending to loosen with respect to the bushing, means for securing said portions together against disassembly comprising a polygonal aperture extending axially in said tread portion, said bushing having a complementary polygonal surface configuration and being disposed axially in said aperture, an annular, outwardly facing recess formed about said bushing roughly centrally thereof and extending a substantial distance inwardly of the polygonal surfaces of the bushing at all points, said recess having axially disposed, opposite side surfaces, annular cut away portions at either end of the bushing forming inwardly extending faces inclined lengthwise of the axis, and means integral with said molded tread and projecting inwardly from the polygonal surfaces of said bushing into oppositely gripping engagement with said axially disposed side surfaces of the recess, and other means integral with said molded tread projecting inwardly adjacent said faces at either end of said bushing for permanently interengaging the parts against relative displacement.

2. A roller comprising a tire mounted on a supporting bushing, said tire comprising an annular molded body, said bushing being snugly received in the central recess in said annular body, with the annular body coaxially embracing the bushing, said body being of relatively soft material adapted for use upon a wearable surface, means for securing the tire and bushing in permanently assembled relationship comprising multisided, axially extending surfaces forming the outer sides of said bushing, and complementary, multisided, inner surfaces forming the interior boundaries of said recess for complementary interengagement with the bushing, an outwardly facing channel formed about said bushing and extending inwardly of said surfaces, annular cut-away portions at either end of the bushing, an annular inwardly projecting rib integral with said molded body and being molded permanently into said channel in gripping engagement with the surfaces of said channel, and other annular inwardly projecting ribs integral with said molded body and being molded permanently into said annular cut-away portions at either end of said bushing in gripping engagement with the surfaces of said cut-away portion.

3. A roller comprising a tire mounted on a supporting bushing, said tire comprising an annular body, said bushing being received snugly in the central recess in said annular body with the annular body coaxially embracing the bushing and extending axially outwardly beyond the bushing on both ends of the bushing, said body being of relatively soft material adapted for use upon a wearable surface, means for securing the tire and bushing in permanently assembled relationship comprising multisided, axially extending surfaces forming the outer sides of said bushing and complementary multisided inner surfaces forming the interior boundaries of said recess for complementary interengagement with the bushing, an outwardly facing channel formed about said bushing and extending inwardly of said surfaces, and an annular, inwardly projecting rib integral with said molded body and being molded permanently into said channel for permanently joining the assembly.

4. In a roller for a roller skate or the like, comprising a molded tread portion and a central bushing portion of metal, said tread being formed of relatively soft material tending to loosen with respect to the bushing and extending axially outwardly beyond the bushing on both ends of the bushing, means for securing said portions together against disassembly comprising a polygonal aperture extending axially in said tread portion, said bushing having a complementary polygonal surface configuration and being disposed axially in said aperture, an annular, outwardly facing recess formed about said bushing roughly centrally thereof and extending a substantial distance inwardly of the polygonal surfaces of the bushing at all points, said recess having axially disposed, opposite side surfaces, annular cut-away portions at either end of the bushing forming inwardly extending faces inclined lengthwise of the axis, and means integral with said molded tread and projecting inwardly from the polygonal surfaces of said bushing into oppositely gripping engagement with said axially disposed side surfaces of the recess, and other means integral with said molded tread projecting inwardly adjacent said faces at either end of said bushing for permanently interengaging the parts against relative displacement.

ROBERT R. WARE.